US00RE45208E

(19) United States
(12) Reissued Patent
Humphrey et al.

(10) Patent Number: US RE45,208 E
(45) Date of Reissued Patent: Oct. 28, 2014

(54) DUAL-CHARGER SYSTEM

(71) Applicant: Lear Corporation, Southfield, MI (US)

(72) Inventors: Stephen Humphrey, Livonia, MI (US); Thomas O'Brien, Troy, MI (US); Benjamin D. Sweet, West Bloomfield, MI (US); Ryan Beehler, Canton, MI (US); Richard Hampo, Plymouth, MI (US)

(73) Assignee: Lear Corporation, Southfield, MI (US)

(21) Appl. No.: 13/766,880

(22) Filed: Feb. 14, 2013

Related U.S. Patent Documents

Reissue of:
(64) Patent No.: 8,319,478
Issued: Nov. 27, 2012
Appl. No.: 12/856,839
Filed: Aug. 16, 2010

(51) Int. Cl.
*H01M 10/46* (2006.01)

(52) U.S. Cl.
USPC ..... 320/138

(58) Field of Classification Search
USPC ..... 320/103, 104, 107, 114, 115, 138
See application file for complete search history.

(56) References Cited

U.S. PATENT DOCUMENTS

| | | | | |
|---|---|---|---|---|
| 5,323,099 | A * | 6/1994 | Bruni et al. | 320/108 |
| 6,794,851 | B2 | 9/2004 | Murakami et al. | |
| 7,615,900 | B1 * | 11/2009 | Harris | 310/81 |
| 7,772,799 | B2 | 8/2010 | Wu | |
| 2004/0070369 | A1 | 4/2004 | Sakakibara | |
| 2005/0040790 | A1 | 2/2005 | Ito et al. | |
| 2007/0080662 | A1 | 4/2007 | Wu | |
| 2008/0257620 | A1 * | 10/2008 | Poulsen | 180/65.2 |
| 2009/0045775 | A1 * | 2/2009 | Popescu Stanesti et al. | 320/126 |
| 2009/0212738 | A1 * | 8/2009 | Coonan et al. | 320/113 |
| 2009/0251106 | A1 * | 10/2009 | Samstad | 320/141 |
| 2011/0055037 | A1 * | 3/2011 | Hayashigawa et al. | 705/26.1 |
| 2012/0181983 | A1 * | 7/2012 | Khan et al. | 320/109 |

FOREIGN PATENT DOCUMENTS

| | | | |
|---|---|---|---|
| CN | 1441526 | A | 9/2003 |
| CN | 1620796 | A | 5/2005 |
| CN | 201547510 | U | 8/2010 |
| JP | 2000299136 | A | 10/2000 |

OTHER PUBLICATIONS

German Patent & Trademark Office, Office Action for corresponding German Patent Application No. 10 2011 017 567.9 mailed Nov. 8, 2012.

Chinese Patent Office, Office Action for the corresponding Chinese Patent Application No. 201110224880.7 mailed Nov. 23, 2012.

* cited by examiner

*Primary Examiner* — Edward Tso
(74) *Attorney, Agent, or Firm* — Brooks Kushman P.C.

(57) ABSTRACT

A dual-charger system operable to facilitate charging a battery with energy regulated by two chargers connected in parallel to the battery where one charger operates according to a voltage regulation mode and the other of the two chargers operates according to a current regulation mode.

19 Claims, 5 Drawing Sheets

DUAL-CHARGER SYSTEM

Matter enclosed in heavy brackets [ ] appears in the original patent but forms no part of this reissue specification; matter printed in italics indicates the additions made by reissue.

BACKGROUND

1. Technical Field

The present invention relates to chargers used to facilitate charging a battery, such as but not limited to chargers of the type found in vehicles to charge a vehicle battery with energy provide from a source outside of the vehicle.

2. Background Art

Hybrid electric vehicles, electric vehicles, and other types of vehicles or devices that otherwise provide some level of vehicle propulsion with an electric motor may include a battery to source the electric energy needed to power the electric motor. In some cases, the battery may be charged with energy provided from a source outside of the vehicle, such as with energy provided through a wall outlet, charging station, electric vehicle supply equipment (EVSE), etc. Because the battery requires energy provided from the source outside of the vehicle to be regulated before it can be used to charge the battery, a need exists for a charger system to prepare the source energy for use in charging the battery.

BRIEF DESCRIPTION OF THE DRAWINGS

The present invention is pointed out with particularity in the appended claims. However, other features of the present invention may become more apparent and the present invention may be best understood by referring to the following detailed description in conjunction with the accompany drawings in which:

DETAILED DESCRIPTION

Figure 1:
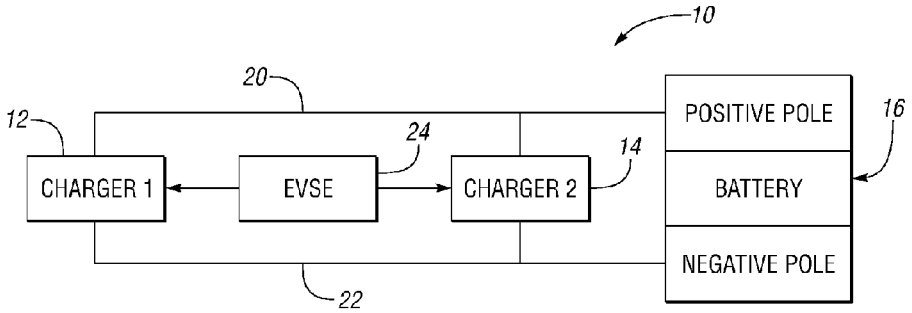
FIG. 1 illustrates a dual-charger system in accordance with one non-limiting aspect of the present invention.

FIG. 1 illustrates a dual-charger system 10 in accordance with one non-limiting aspect of the present invention. The system 10 is shown to include a first charger 12 and second charger 14 connected parallel to a battery 16 included within a vehicle (not shown). The first and second chargers 12, 14 may include positive and negative output that commonly connect to positive and negative poles of the battery by way of positive and negative connected cables 20, 22. The first and second chargers 12, 14 may include an input to a receptacle included in the vehicle to which a cordset used to connected to a wall outlet or other electric vehicle supply equipment (EVSE) 24 may connected in order to provide energy to the first and second chargers 12, for manipulation prior to being used to charge the battery 16.

While the first and second chargers 12, 14 are shown to be commonly connected to the connecting cables 20, 22, any number of other configurations may be used to connect the chargers 12, 14 in parallel to the battery 16. This exemplary connection configuration is not intended to unnecessarily limit the scope and contemplation of the present invention. The present invention is predominately described with respect to the EVSE 24 providing AC energy to each of the first and second chargers 12, 14 that is then to be converted by the first and second chargers 12, 14 to DC energy sufficient to charge the battery 16. This, also, is done for exemplary purposes and without intending to unnecessarily limit the scope and contemplation of the present invention as the present invention fully contemplates and number of configurations for providing AC or DC energy to the chargers 12, 14 for use in charging the battery 16.

The dual-charge system 10 allows for shorter charging time since one charger is not responsible for meeting all current demands, and in the event current demand is high, the use of two chargers 12, 14 to meet the corresponding demand may be quicker than a single charger arrangement since the current demand increases can be spread across both chargers 12, 14. In the event future charging demands are greater, the dual-charger system 10 may be scaled to include additional chargers (e.g., three, four or more chargers connected in parallel). Optionally, the first and second chargers 12, 14 may be identical (same hardware, software, part number, CAN database, etc) in order to simplify manufacturing as well as end customer assembly. The first and second chargers 12, 14 may be operable to directly handle handshaking signals such as control pilot and proximity detect as defined in SAE J1772, such as by replicating or passing through instructions set to one charger to the other.

Optionally, from the viewpoint of a vehicle control module or other vehicle-based controller or module tasked with coordinating activities of various vehicle systems and subsystems, the dual charger system 10 may appear as a single unit, i.e., as if the first and second chargers 12, 14 appeared on a vehicle bus (not shown) and to other vehicle controls as a single charger. In this manner, the vehicle can send a single command to the charging system 10 and expect in return a single set of statuses, which can be used to remove the burden of controlling two separate chargers 12, 14 from the vehicle, and makes scaling the system from one to two chargers a matter of changing a wire harness.

The appearance of single-charger may be facilitate with one charger 12 taking on the role of master, and perform load balancing of the charging system 10, while other charger 14 acts as in the role of slave. This entails determining if one or both chargers 12, 14 are required to generate the requested output from the vehicle. If only a single charger 12, 14 is required to meet the requested output, i.e. the charging voltage and charging current desired to charge the battery 16, then the master can randomly select between itself and the second charger to handle the task. By using a single charger it increases the efficiency of the system 10, and by randomly selecting between the two chargers 12, 14, the life of the system 10 can be extended by spreading the utilization across both chargers equally.

In the event both chargers 12, 14 are required to meet the requested output demand, then the master charger 12 may perform load balancing to distribute the load between the two chargers 12, 14. It may essentially set both chargers 12, 14 output voltages to the requested value, and set each charger 12, 14 to provide half the requested current. One of the chargers 12 may be placed in voltage limiting mode while the other charger 14 may be placed in current limiting mode, thereafter, to account of output variations of the other charger 12. In this manner, the voltage from one charger 14 can be unregulated and the voltage from the charger 12 can be regulated to compensate for variations in the unregulated voltage. A similar current control strategy can be employed such that current output from one charger 12 is unregulated while the current from the other charger 14 is regulated as a function thereof.

Figure 2:
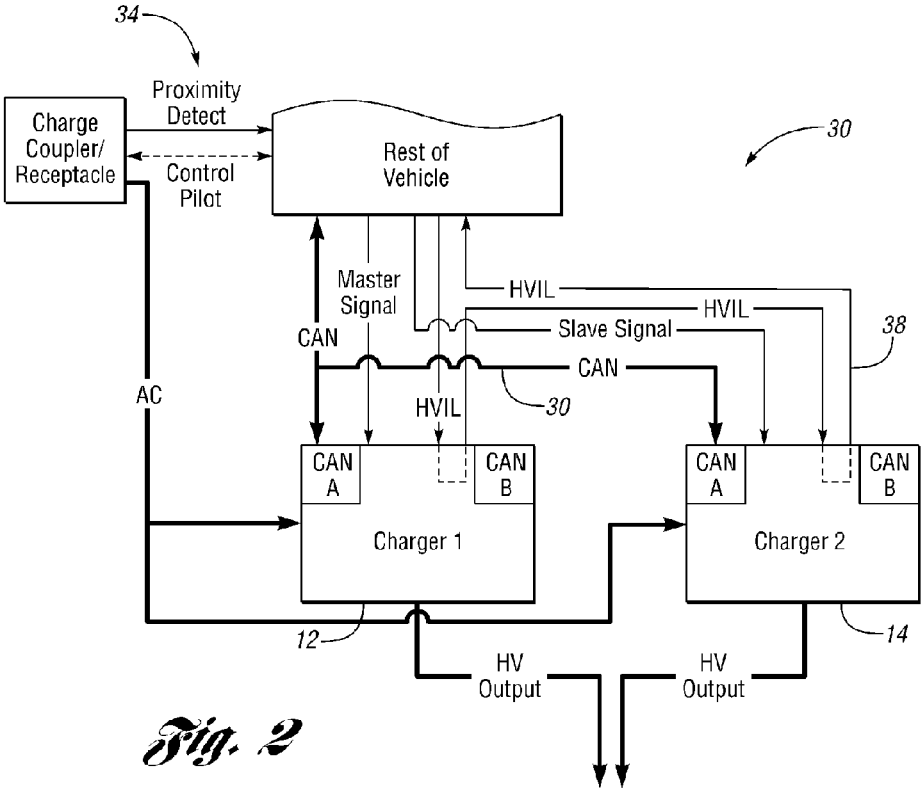
FIG. 2 illustrates a direct connection arrangement in accordance with one non-limiting aspect of the present invention.

FIG. 2 illustrates a direct connection arrangement 30 of the first and second chargers 12, 14 in accordance with one non-limiting aspect of the present invention. The system 30 is shown with the first and second chargers 12, 14 connecting directly to a vehicle bus 32. Hardware inputs and outputs (I/O) present in the vehicle bus 32 provide an indication of which charger 12, 14 may be a master and which charger may be a slave. These inputs may be checked on power up, and their state may be used to configure the set of CAN messages that the charger 12, 14 may transmit and receive based on its defined role. Also, in this type of system 30, the control pilot and proximity signals 34 from the cordset may be handled by some other module in the vehicle.

In the multiple charger ECU control system, i.e., where each charger 12, 14 includes an ECU, the role of the two chargers 12, 14 may be determined via hardware signals in the harness (shown as master signal and slave signal). This can be accomplished by one or more digital inputs (high=master, low=slave for example). One input value may be defined to be for the master, and all other input value combinations may be defined to be for the slave. The master charger 12 may have the responsibility of processing the output request from the vehicle and transmitting a special slave charger command message to the second slave charger 14 in order to control it. It may then have to receive the slave charger's status and combine it with its own status and send a single charging system status message back to the vehicle. While the slave charger command and status messages may be present on the vehicle bus 30, they may be used for inter-charger communication and ignored by the rest of the vehicle.

As with many vehicle electronic control modules, the ability to reprogram the unit over the vehicle bus 30 as well as diagnose issues in the units is important for service. Each charger 12, 14 may be defined to have a unique set of diagnostic IDs, allowing each charger 12, 14 to be targeted individually for troubleshooting and reprogramming. A high voltage interlock (HVIL) signal 38 is shown to travel between the vehicle bus 30, first charger 12 and second charger 14. The HVIL signal 38 may be pulse-train that continuous travels between each device and used to detect errors or other disruptions that result in interruptions to the pulse-train.

Figure 3:
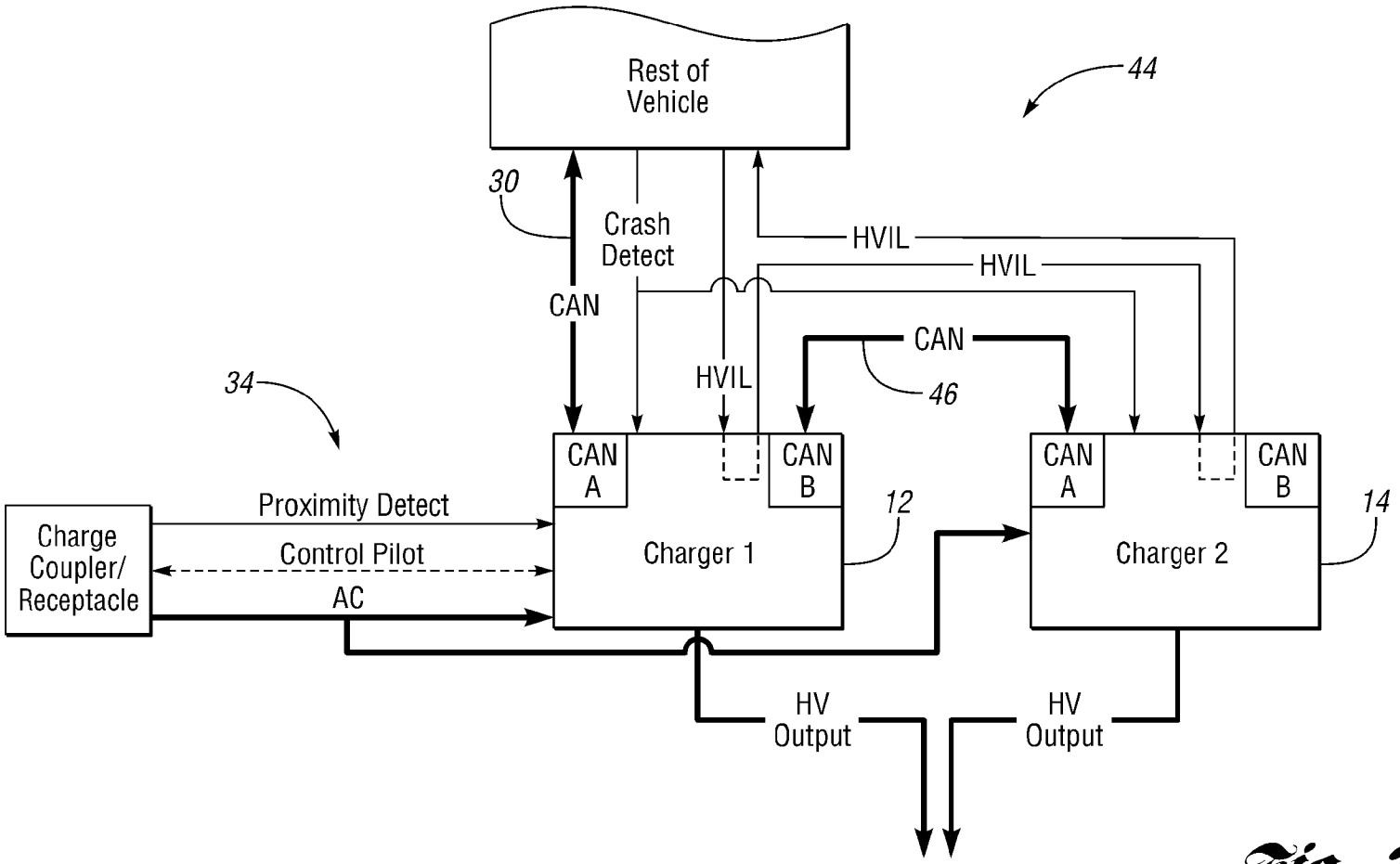
FIG. 3 illustrates a cascaded connection arrangement in accordance with one non-limiting aspect of the present invention.

FIG. 3 illustrates a cascaded connection arrangement 44 of the first and second chargers 12, 14 in accordance with one non-limiting aspect of the present invention. In this arrangement 44, only the first charger (the master) 12 is connected directly to the vehicle bus 30 as the second charger (the slave) 14 is "daisy chained" to the first charger 12 via a second CAN channel 46. This connection scheme results in the first charger 12 acting as a gateway for the second charger 14 and without the second charger 14 having to be aware of the existence of the first charger 12. The second charger 14 may behave as a standalone charger with the exception that its control pilot and proximity detect signals 34 may be overridden with CAN signals since these signals may not be physically connected to multiple chargers.

Figure 4:
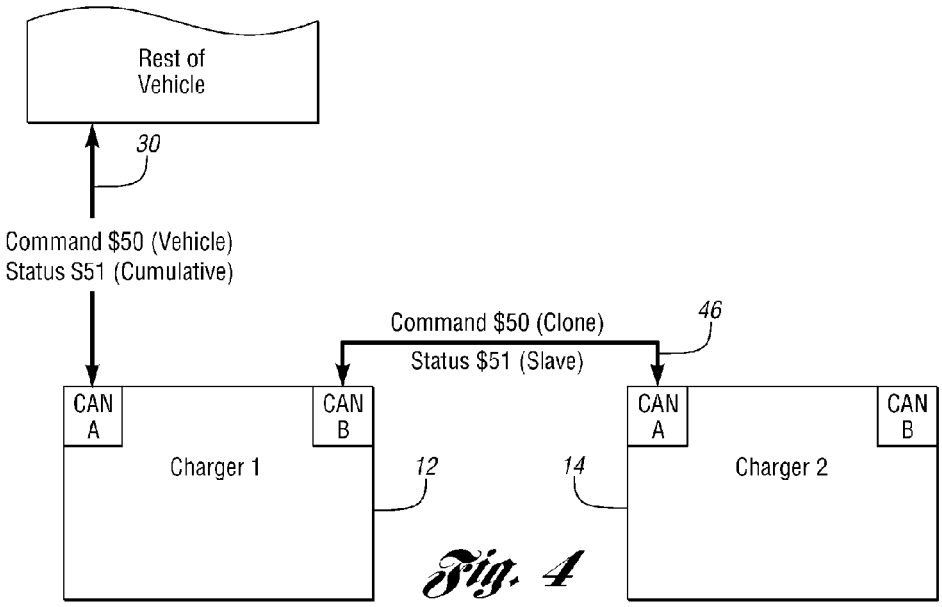
FIGS. 4-7 illustrate vehicle message communications in accordance with non-limiting aspects of the present invention.

In the cascaded control system 44, the master charger 12 may behave as a standalone charger 12 until it detects communication from a second charger 14 on its CAN B bus. When this occurs, first charger may become a master. The second charger 14, may become the slave, and essentially operate the exact same as a single charger would when connected directly to the vehicle. For charging control, it may be assumed that the vehicle may send a single command ($50) to what is believed to be a single charger and expect a single status response ($51) back, all via CAN A, as shown in FIG. 4. By default, all chargers may operate in the "slave" mode, simply taking in the command ($50) and returning the status ($51).

Each charger may always have its CAN B setup to receive the same status message ($51) in order to detect if a second charger 14 is present. If a charger 12, 14 receives the status message ($51) on its CAN B then it may determine that a second "slave" charger 14 is present and it should take on the role of "master" and begin load balancing as required. To do this it may take in the command ($51) from the vehicle on CAN A and determine what portion of the request it may handle, and send the other portion via CAN B using a "cloned" command message ($50) which the slave charger may simply interpret as a command from the vehicle, unaware that the master charger is even in the system.

The master may also then take the slave's status response ($51) it receives on CAN B and combine the information in it with its own, and send a cumulative status message ($51) to the vehicle via CAN A. If at any point the master charger 12 stops receiving the slave charger's status message ($51) on CAN B for some defined timeout period, it can simply default back into normal mode as if it was the only charger present. Since control pilot and proximity detect signals 34, which due to design can not be simply split to the two chargers, the master charger 12 may need to package the two signals statuses and send them via a special message (for example, ID $40) on CAN B that tells the slave charger 14 to ignore the actual physical signals (which won't be connected) and instead use the supplied values. Upon receiving this message, the slave 14 may substitute the real physical signal values with the supplied status values from the can message and may use the supplied AC current limit in place of the actual one that would be decoded from the control pilot signal 34.

Figure 5:
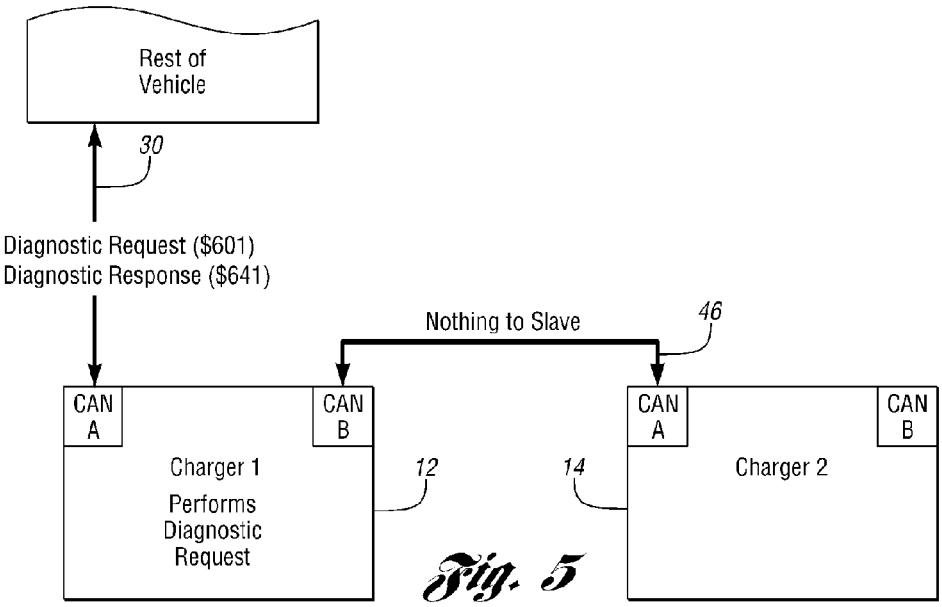

Both chargers 12, 14 may be configured to receive two physical Diagnostic IDs. One may be used to request information from the master charger, and the second may be used to send the request through the master 12 and to the slave charger 14. For example, assuming that the Diagnostic ID for the Master is $601 for the request and $641 for the response and for the Slave they are $602/$642 respectively, in the event a technician requests diagnostic information from the master charger, then they would send a diagnostic request using ID $601, and look for the response using ID $641, as shown in FIG. 5. In this case the master would handle performing the requested action.

Figure 6:
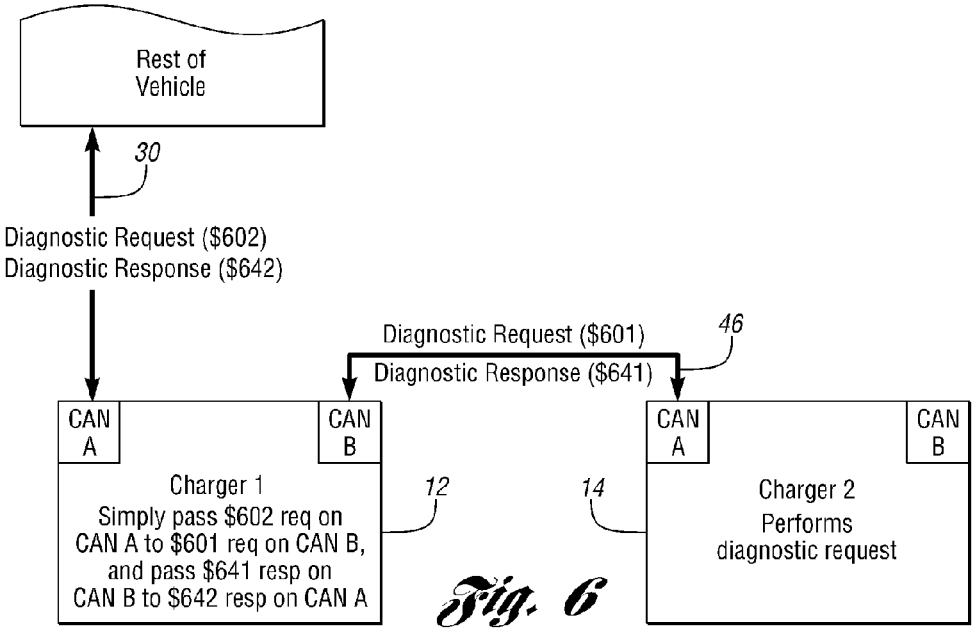

In the event a technician requests diagnostic information from the slave charger 14 in a two charger system, then they can send a diagnostic request using ID $602, and look for the response using ID $642. In this case the master 12 would simply pass the diagnostic request to the slave charger 14 via CAN B, by sending a "cloned" $601 request, as shown in FIG. 6. The slave 14 would then perform the action and return a response $641, that the master 12 would then pass back to the system via CAN A using ID $642.

Figure 7:
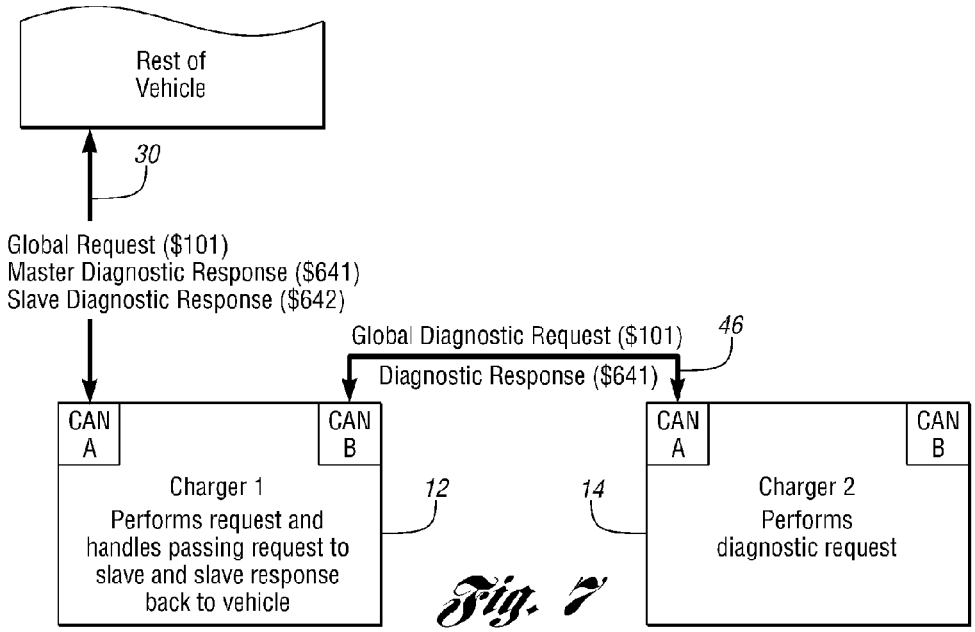

For the case of global diagnostic requests (ID $101 for example), the master may first pass along the request via CAN B to the slave, then perform the requested action, and then send its own response ($641), and then pass along the response from the slave ($642), as shown in FIG. 7. This design should allow for simple reflashing of both chargers 12, 14 by allowing a technician to simply perform one reprogramming session with the Master using its physical ID ($601), and then once complete repeat the process for the slave using its physical ID ($602). For the slave reprogramming the master node may simply take the diagnostic requests from CAN A ($602) and reroute them to CAN B using ID $601 to the slave. It may then take the responses from the slave ($641) it receives on CAN B and reroute them onto CAN A using ID $642.

Below is a table representing CAN messages that may need to be configured based on the simplified example messages listed for the cascaded connection arrangement shown in FIG. 3.

| | | Configuration | |
|---|---|---|---|
| ID | Description | CAN A | CAN B |
| | Functional | | |
| $50 | Vehicle Command | Rx | Tx |
| $51 | Charger Status | Tx | Rx |
| $40 | Bypass Mode | Rx | Tx |
| | Diagnostic | | |
| $101 | Global Diagnostic Request | Rx (D) | Tx |
| $601 | Master Physical Request | Rx (D) | Tx |
| $602 | Slave Physical Request | Rx | -NA- |
| $641 | Master Diagnostic Response | Tx (D) | Rx |
| $642 | Slave Diagnostic Response | Tx | -NA- |

Figure 8:
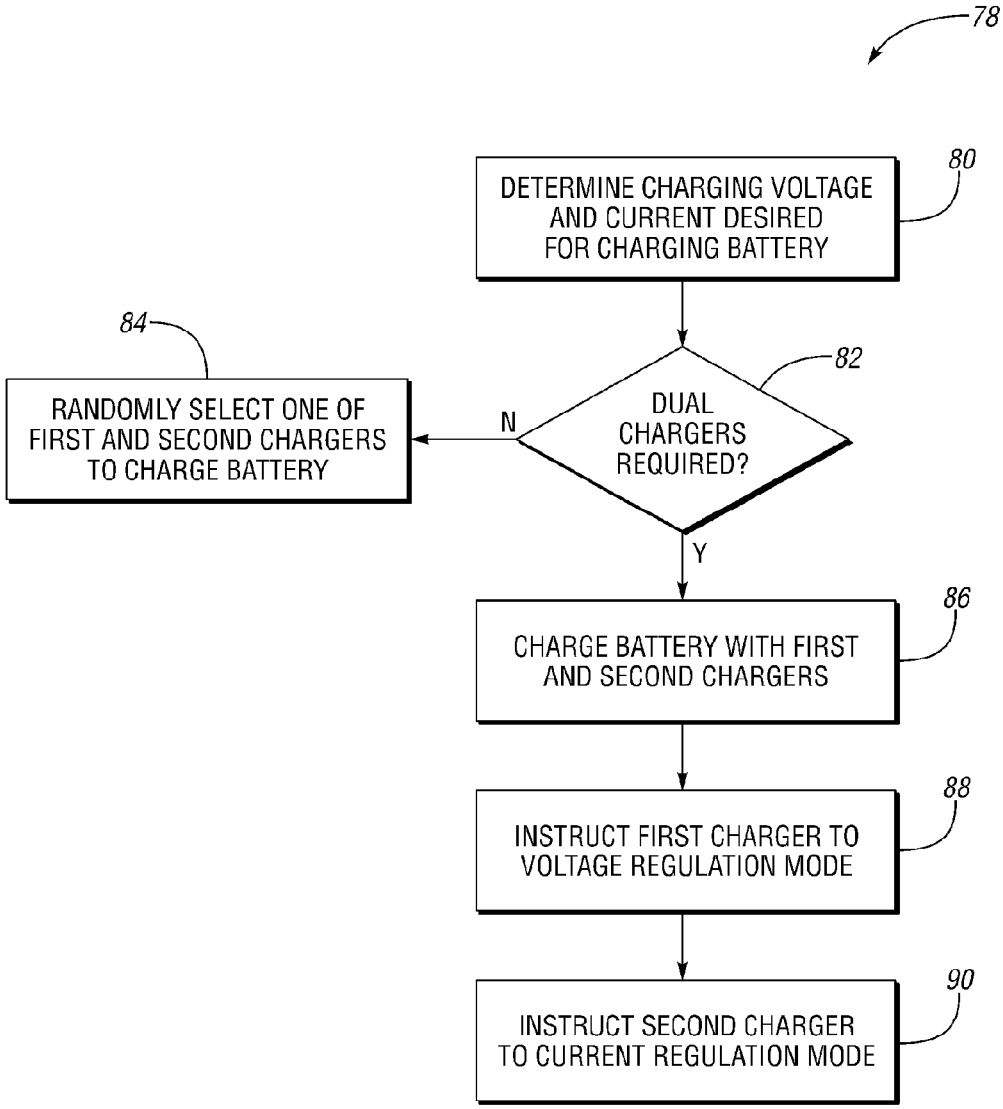
FIG. 8 illustrates a flowchart of a method for regulating charging of a dual-charger system in accordance with one non-limiting aspect of the present invention.

Tx = Transmit message
Rx = Receive message
(D) = configured to be handled by diagnostics FIG. 8 illustrates a flowchart 78 of a method for regulating charging of a dual-charger system in accordance with one non-limiting aspect of the present invention. The method may be implemented with the assistance of a computer-readable medium or other logically executing element residing in one or more of the chargers 12, 14 and/or vehicle controllers. For exemplary purposes, the method is predominately described with respect to a dual-charger configuration where a first charger 12 is connected in parallel with a second charger 14 and both chargers 12, 14 receive a common AC supply through an EVSE or other interface sufficient to provide energy from a source outside of the vehicle. Of course, the present invention is not intended to be so limited and fully contemplates the source being within the vehicle and having other configurations for the chargers 12, 14.

Block 80 relates to determining a charging voltage and a charging current desired for charging the battery 16. The charging voltage and current may be determined by a battery monitoring system (BMS), one or more of the first and second chargers 12, 14, or some other device within the vehicle. The charging voltage and current may be based on a current voltage level and current level of the battery, operating/design characteristics of the battery, operation characteristics and capabilities of the vehicle, and other parameters sufficient to determine the amounts of the charging voltage and current needed to facilitate charging the battery 16 to a desired level. The charging voltage and currents may change dynamically during charging and with operation of the vehicle and may be correspondingly adjusted throughout the charging process such that the outputs of the first and/or second chargers 12, 14 may be similarly adjusted therewith.

Block 82 relates to determining whether both of the first or second chargers 12, 14 or more chargers if more chargers are available, are needed to provide the charging voltage and current. One non-limiting aspect of the present invention contemplates configuring the dual chargers 12, 14 to be required during normal charging activities so that power demands on each charger 12, 14 can be less than that which would otherwise be required with the use of a single charger. As such, the need to supply the charging voltage and current from only one of the first and second chargers 12, 14 may be limited to situations in which lower voltages and currents are needed for charging. Block 84 relates to randomly selecting one of the chargers 12, 14 to provide the charging voltage and current when only one charger is needed with the aim of repeated, single-charger charging events to be equally distributed between the first and second chargers 12, 14.

Block 86 relates to charging the battery 16 with voltages and currents being provided from each of the first and second chargers 12, 14. The voltages and currents contributed by the first and second chargers 12, 14 are referred to respectively and correspondingly as first and second voltages and first and second currents. In the event the first and second chargers 12, 14 are operable to convert AC energy to DC energy, the first and second voltages and first and second currents may be DC. Of course, the present invention is not intended to be so limited and fully contemplates the chargers 12, 14 being operable to regulate AC energy to AC energy, DC energy to DC energy and/or DC energy to AC energy. The first and second chargers 12, 14 may be operated while regulating the charging of the battery by selecting one of the chargers 12 to implement voltage control, shown to be the first charger (Block 88), and the other one of the chargers 14 to implement current control, shown to be the second charger (Block 90).

The voltage and current control modes may be implemented with different ones of the first and second chargers 12, 14 in order to prevent instability, continuous adjustments, and other unnecessary controls that could be produced in the event each charger 12, 14 was responsible for regulating current and voltage control. One non-limiting aspect of the present invention contemplates commanding one of the chargers 14 to provide more voltage than the other charger 12 and the other one of the chargers 12 to provide more current than the other charger 14 and then instructing each lower voltage and lower current limited ones of the chargers 12, 14 to respectively be responsible for regulating voltage and current.

The charger responsible for regulating voltage, shown as the first charger 12, will monitor the net voltage to the battery 16, which is the combination of the actual voltages output from the first and second chargers 12, 14. In the event the net voltage is greater than the charging voltage, the first charger 12 will decrease the first voltage by a corresponding amount, and in the event the net voltage is less than the charging voltage, the first charger 12 will increase the first voltage by a corresponding, proportional amount. The second charger 14 will not require any corresponding adjustment, i.e., it will not require a corresponding instruction to increase/decrease voltage, since it will automatically be pulled to the same voltage as the first charger 12 due to the second charger 14 having a greater voltage limit than the first charger 12.

The charger responsible for regulating current, shown as the second charger 14, will monitor the net current to the battery 16, which is the combination of the actual currents output from the first and second chargers 12, 14. In the event the net current is greater than the charging current, the second charger 14 will decrease the second current by a corresponding amount, and in the event the net current is less than the charging current, the second charger 14 will increase the second current by a corresponding, proportional amount. In order to evenly split the current demands, and thereby the power requirements of each charger 12, 14, the desired charging current may be equally split between each charger 12, 14, such that the first charger 12 provides half of the charging current and the second charger 14 provides the other half of the charging current. Any adjustments thereafter may be made by the second charger 14 and without corresponding instructions to the first charger 12 since the first charger 12 has a greater current limit than the second charger 14.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

What is claimed is:

1. A dual-charger system for use in charging a battery within a vehicle using energy provided from an AC source outside of the vehicle, the system comprising:

a first charger being operably connected to the AC source, the first charger being operable to charge the battery with a first DC voltage and a first DC current; and a second charger being operably connected to the AC source and in parallel with the first charger, the second charger being operable to charge the battery with a second DC voltage and *a* second DC current*;*

*wherein the chargers are in a connection arrangement such that the chargers appear to a vehicle controller as being a single charger;*

*wherein the first charger is further operable to vary the first DC voltage as a function of a difference between a net voltage set by a combination of the first and second DC voltages and a charging voltage desired for charging the battery*.

[2. The system of claim 1 wherein the first charger is further operable to vary the first DC voltage as a function of a difference between a net voltage set by a combination of the first and second DC voltages and a charging voltage desired for charging the battery.]

3. The system of claim [2] *1* wherein the first charger is further operable to decrease the first DC voltage when the net voltage increases and to increase the first DC voltage when the net decreases, wherein the first charger is further operable to increase and decrease the first DC voltage in proportion to a difference between the net voltage and the charging voltage.

4. The system of claim 1 wherein the second charger is further operable to vary the second DC current as a function of difference between a net current set by a combination of the first and second DC currents and a charging current desired for charging the battery.

5. The system of claim 4 wherein the second charger is further operable to decrease the second DC current when the net current increases and to increase the second DC current when the net current decreases, wherein the second charger is further operable to increase and decrease the second DC current in proportion to a difference between the net current and the charging current.

6. The system of claim 1 wherein a charging voltage and a charging current is desired for charging the battery and wherein:

(i) a first voltage limit of the first charger is set to a voltage approximately equal to the charging voltage, the first charger being prevented from outputting the first DC voltage above the first voltage limit;

(ii) a second voltage limit of the second charger is set to a voltage greater than the charging voltage, the second charger being prevented from outputting the second DC voltage above the second voltage limit;

(iii) a first current limit of the first charger is set to a current greater than half of the charging current, the first charger being prevented from outputting the first DC current above the first current limit; and (iv) a second current limit of the second charger is set to a current no greater than half of the charging current, the second charger being prevented from outputting the second DC current above the second current limit.

7. The system of claim 1 wherein each of the first and second chargers connect to a positive cable connected to a positive pole of the battery and a negative cable connected to a negative pole of the battery such that the first charger and second charger are in parallel.

8. The system of claim 1 wherein the first and second chargers are each further operable to receive energy from the AC source through electric vehicle supply equipment (EVSE).

9. A method of regulating output of first and second chargers that are connected in parallel with one another, the first and the second chargers being operable to charge a battery included within a vehicle, the method comprising:

determining a charging voltage and a charging current needed to charge the battery;

in the event both of the first and second charger are required to provide the charging voltage and the charging current, performing the operations of:

(i) commanding the first charger to output a first voltage that is generally equal to the charging voltage desired for charging the battery;

(ii) commanding the second charger to output a second voltage that is greater than the charging voltage;

(iii) commanding the first charger to output a first current; and (iv) commanding the second charger to output a second current that is generally equal to a difference between the first current and the charging current.

10. The method of claim 9 further comprising:

(i) commanding only the first charger to decrease the first voltage by an amount proportional to the first amount in the event the combined first and second voltage is greater than the charging voltage by a first amount; and (ii) commanding only the first charger to increase the first voltage by an amount proportional to the second amount in the event the combined first and second voltage is less than the charging voltage by a second amount.

11. The method of claim 9 further comprising (i) commanding only the second charger to decrease the second current by an amount proportional to the first amount in the event the combined first and second current is greater than the charging current by a first amount; and (ii) commanding only the second charger to increase the second current by an amount proportional to the second amount in the event the combined first and second current is less than the charging current by a second amount.

12. The method of claim 9 further comprising commanding the first charger to provide the first current equal to generally one half of the charging current.

13. The method of claim 9 further comprising commanding a randomly selected one of the first and second chargers to provide the charging voltage and current in the event a single one of the first and second chargers is capable of providing the charging voltage and current.

14. A dual-charger system for use in charging a battery via energy from [an] *a* source, the system comprising:

a first charger being operably connected to the source, the first charger being operable to charge the battery with a first voltage and a first current; and a second charger operably connected to the source in parallel with the first charger, the second charger being operable to charge the battery with a second voltage and a second current*;*

*wherein one of the chargers operates according to a voltage regulation mode and the other one of the chargers operates according to a current regulation mode*.

15. The system of claim 14 wherein the second charger is instructed to output the second voltage to be greater than the first voltage.

16. The system of claim 14 wherein the first charger is instructed to output the first current to be no more than half of a charging current desired for charging the battery.

17. The system of claim 16 wherein the second charger is instructed to output the second current to be approximately equal to a difference between the first current and the charging current.

18. The system of claim 15 wherein one of the first and second chargers is deactivated in the event the other one of the first and second chargers is able to provide voltage and current sufficient to meet a charging voltage and charging current desired for charging the battery.

19. The system of claim 15 wherein each of the first and second chargers are within a vehicle and commonly connect to a receptacle with the vehicle operable to receive energy through electric vehicle supply equipment (EVSE).

20. The system of claim 19 wherein the first and second chargers are operable to convert AC energy to DC energy such that each of the first and second voltages and first and second currents are DC.

* * * * *